United States Patent [19]

Reinhold et al.

[11] Patent Number: 4,914,296

[45] Date of Patent: Apr. 3, 1990

[54] INFRARED CONVERTER

[75] Inventors: Ralph R. Reinhold; Melvin G. Wode, both of Huntsville, Ala.

[73] Assignee: The Boeing Company, Seattle, Wash.

[21] Appl. No.: 184,190

[22] Filed: Apr. 21, 1988

[51] Int. Cl.⁴ .......................... G01J 5/00; H01J 31/50

[52] U.S. Cl. .................................... 250/330; 250/332; 250/213 VT

[58] Field of Search ......... 250/213 VT, 213 R, 327.2, 250/332, 333, 338.1, 340, 370.08, 395, 338.4

[56] References Cited

U.S. PATENT DOCUMENTS

| | | | |
|---|---|---|---|
| 2,120,916 | 6/1938 | Bitner | 250/330 |
| 2,739,244 | 3/1956 | Sheldon | 250/330 |
| 2,879,424 | 3/1959 | Garbuny et al. | 250/330 |
| 3,188,467 | 6/1965 | Weissenberg | 250/213 |
| 3,321,659 | 5/1967 | Brody | 250/213 |
| 3,333,133 | 7/1967 | Morton et al. | 250/213 |
| 3,368,077 | 2/1968 | Kazan | 250/213 R |
| 3,387,162 | 6/1968 | Schagen et al. | 250/213 |
| 3,543,034 | 11/1970 | Finkle | 250/213 |
| 3,663,821 | 5/1972 | Finkle | 250/213 |
| 3,887,810 | 6/1975 | Skaggs | 250/370 |
| 3,950,645 | 4/1976 | Rotstein et al. | 250/352 |
| 4,032,783 | 6/1977 | Koda | 250/333 |
| 4,224,520 | 9/1980 | Greene et al. | 250/338 |
| 4,631,406 | 12/1986 | Nakata | 250/338.3 |
| 4,701,618 | 10/1987 | Tosswill | 250/332 |
| 4,803,360 | 2/1989 | Ball et al. | 250/338.3 |

OTHER PUBLICATIONS

Fisher, Arthur D., et al., "Photoemitter Membrane Light Modulator", Optical Engineering, Feb. 1986, vol. 25, No. 2, pp. 261–268.

Casasent, David, "Optical Data Processing for Engineers", Electro-Optical Systems Design, Apr. 1978, pp. 34–49.

Wiza, Joseph, "Microchannel Plate Detectors", Nuclear Instruments and Methods, vol. 162, 1979, pp. 587–601.

*Primary Examiner*—Janice A. Howell
*Assistant Examiner*—J. Eisenberg
*Attorney, Agent, or Firm*—Finnegan, Henderson, Farabow, Garrett & Dunner

[57] ABSTRACT

An infrared converter for converting an image of infrared radiation into a visible image or an electrical signal. The infrared converter includes a sensitive element array upon which the infrared image is formed. The array includes an array of electron emitters and associated devices for controlling the rate at which electrons are emitted from the electron emitters in response to infrared radiation incident on the sensitive element array.

14 Claims, 12 Drawing Sheets

INFRARED CONVERTER

BACKGROUND OF THE INVENTION

1. Field of the Invention

The present invention relates to radiation converters and, more particularly, to an apparatus for converting infrared radiation to visible radiation or electric signals.

2. Description of Related Art

The conversion of infrared (IR) radiation to proportionate electrical signals or visible radiation is of great importance in military, industrial and medical imaging. In the art of IR converters and IR imaging, however, there are no known photoemissive materials for infrared wavelengths. Thus, it is necessary to convert IR wavelengths into electrical signals or wavelengths that can be detected or visually perceived.

In current infrared conversion systems a number of different photoconductive and thermally sensitive screens have been placed on vidicon-type imagers. These infrared conversion systems generally have been operated at or above ambient temperature because of the inability to cool the screen and/or prevent condensation on the screen while cold. Operation at such elevated temperatures degrades the performance of the conversion system as a whole.

Some single element infrared converters have been fabricated which utilize an infrared semiconductor as the active layer in a Schottky barrier diode cold cathode. These devices tend to be unsatisfactory because they are limited to operation at temperatures too warm for infrared detectors. Reducing the operating temperatures of these IR converters promotes the formation of surface condensation, thus degrading their performance. To prevent condensation, vacuum enclosures or other hemetically sealed enclosures are required.

Conventional infrared converters also involve the use of complex mechanisms and supporting electronics. The cost of these infrared converters limit their widespread use.

In recent years, much work has been done to produce infrared focal plane arrays for converting infrared radiation into proportionate electrical signals. Existing infrared focal plane arrays require special fabrication techniques reducing production volume and increasing production cost.

Accordingly, the present invention provides an IR converter for converting IR radiation into electrical signals or visible radiation that is mechanically and electrically simple and that can be manufactured at a relatively low cost.

A further object of the present invention is to provide an IR converter that can be easily fabricated using conventional techniques.

A still further object of the present invention is to provide an IR converter that can operate effectively over a large range of temperature conditions.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the objects of the invention, as embodied and broadly described herein, an infrared converter for converting infrared radiation emanating from a scene being viewed into a beam of electrons comprises: (A) an infrared focal plane array having opposed first and second surfaces, the array including: an infrared transparent window having opposed first and second surfaces, the first surface of the infrared transparent window being the first surface of the array, the infrared transparent window being substantially transparent to infrared radiation emanating from the scene being viewed; an electrically conductive window disposed on the second surface of the infrared transparent window, the electrically conductive window being substantially opaque to infrared radiation and including one or more transmission areas substantially transparent to infrared radiation; a photoconductor layer disposed on the conductive window for changing resistivity in response to infrared photons incident thereon; an interface layer disposed on the photoconductor layer; and an emitter layer disposed on the interface layer for emitting electrons, the interface layer providing ohmic contact between the photoconductor layer and the emitter layer; (B) an anode in spaced relation to the electron emitter; and (C) anode supply means for establishing an electric field between the anode and the electron emitter, the electric field attracting electrons emitted from the emitter to the anode.

The accompanying drawings which are incorporated in and constitute a part of this specification illustrate embodiments of the invention and, together with the description, serve to explain the principles of the invention.

DESCRIPTION OF THE PREFERRED EMBODIMENT

Figure 1:
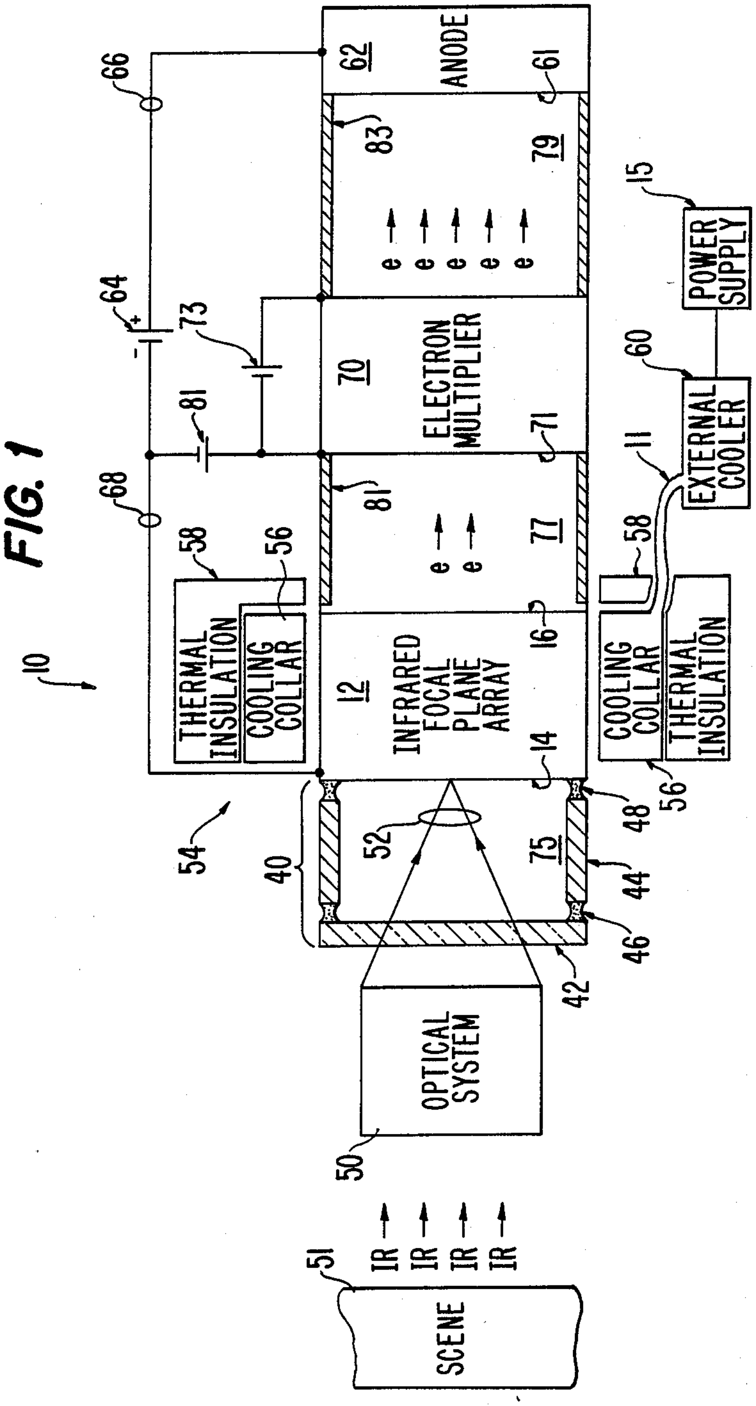
FIG. 1 is a schematic block diagram of an infrared converter in accordance with the present invention.

Reference will now be made in detail to the present preferred embodiments of the invention, examples of which are illustrated in the accompanying drawings. Throughout, common reference numerals refer to common elements.

FIG. 1 illustrates an infrared radiation (IR) converter in accordance with the present invention, referred to generally as 10. The IR converter converts IR radiation, designated "IR", emanating from a scene 51 into a beam of electrons, designated "e", which are attracted to an anode.

In accordance with the present invention, the IR converter includes an infrared focal plane array having opposed first and second surfaces. As embodied herein, and as shown in FIG. 1, an infrared focal plane array 12 has a first surface 14 and a second surface 16. Infrared focal plane array 12 converts an IR image incident on first surface 14 to a beam of electrons emanating from second surface 16 into a first vacuum enclosure 77. The flux density of the electrons emanating from second surface 16 varies in accordance with the flux density of infrared radiation incident on first surface 14.

Figure 2:
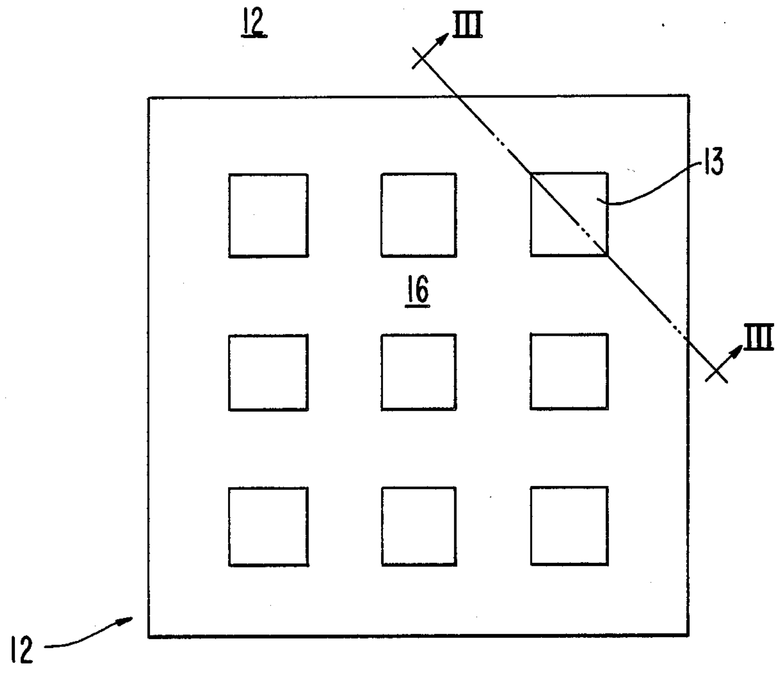
FIG. 2 is a view of a second face of a first preferred embodiment of an infrared focal plane array of the present invention for use in the converter of FIG. 1.
Figure 3:
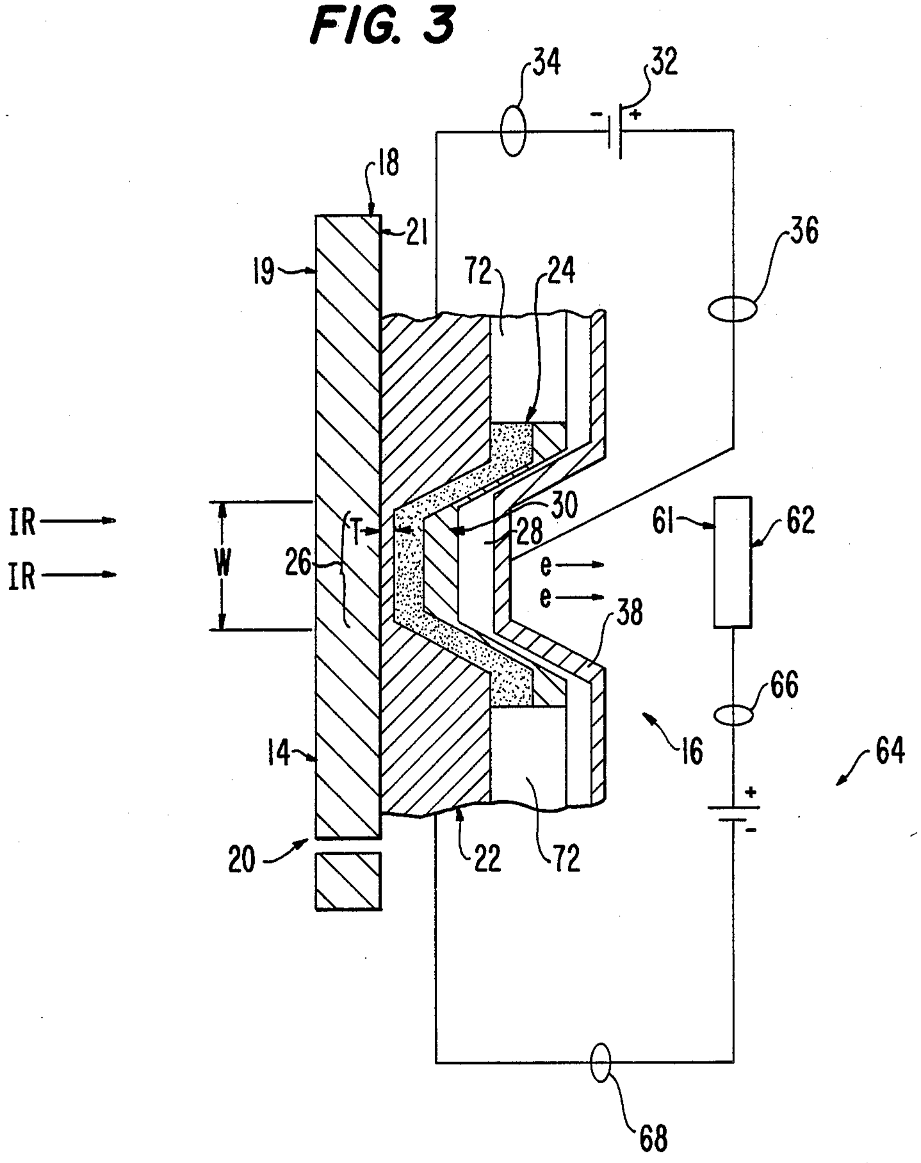
FIG. 3 is a cross-sectional view of a first preferred embodiment of a sensitive element of the infrared focal plane array of FIG. 2 taken along sectional line III—III of FIG. 2.
Figure 4:
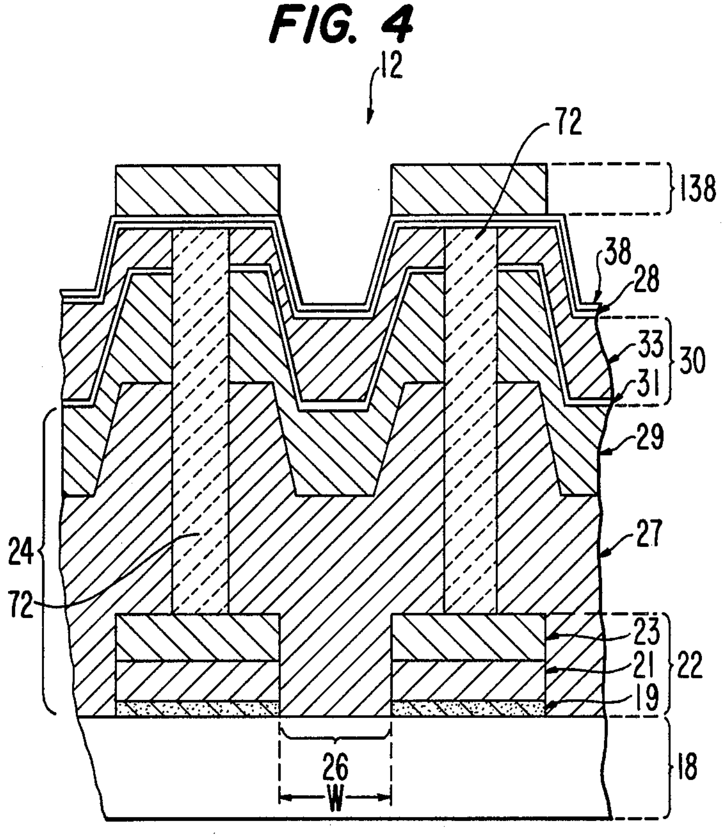
FIG. 4 is an expanded cross-sectional view of the sensitive element of FIG. 3.

FIG. 2 is a view of second surface 16 of focal plane array 12. Focal plane array 12 includes a plurality of sensitive elements, such as sensitive element 13, for example, arranged in an array. FIG. 3 is a cross-sectional view taken along sectional line III—III of FIG. 2 and shows in cross section a preferred embodiment of sensitive element 13 of IR focal plane array 12. Sensitive element 13 preferably includes the individual layers as shown in FIG. 3 and described in reference thereto. Alternatively, several of the individual layers of the sensitive element shown in FIG. 3 may be embodied as multi-layer structures as shown in FIG. 4, and described in reference thereto.

An infrared focal plane array in accordance with the present invention includes an infrared transparent window having opposed first and second surfaces, the first surface of the infrared transparent window being the first surface of the array, the infrared transparent window being substantially transparent to infrared radiation emanating from the scene being viewed. As embodied herein and shown in FIG. 3, an infrared window 18 is provided having a first surface 19 and a second surface 21. First surface 14 of array 12 is first surface 19 of infrared window 18.

Infrared window 18 as embodied herein and shown in FIG. 3, is a single layer of an infrared transparent support material such as zinc selenide or $BaF_2$ that is thick relative to the remaining layers in sensitive element 13 and that is transarent to radiation emanating from the scene 51 being viewed by the IR converter. Infrared window 18 may also be a layer of a material having high thermal conductivity such as germanium or diamond, electrically insulated from the remainder of the IR focal plane array by a thick film of diamond-like carbon or another dielectric. If infrared window 18 is environmentally isolated for cyrogenic operation, at least one hole 20 should be provided through it to assure equalization of pressure across it.

In accordance with the present invention, the infrared focal plane array includes an electrically conductive window disposed on the second surface of the infrared transparent window, the electrically conductive window being substantially opaque to infrared radiation and including one or more transmissive areas substantially transparent to infrared radiation. As embodied herein and shown in FIG. 3, conductive window 22 is made of a material having high thermal and electrical conductivity. As shown in FIG. 3, conductive window 22 includes a transmissive area 26 which, as embodied herein, is an area of conductive window 22 of reduced thickness, "T". This area of reduced thickness may be produced by, for example, etching back the area of conductive window 22 corresponding to transmissive area 26 by well known photolithographic techniques. The structure and function of transmissive area 26 is more fully discussed below in reference to FIG. 4.

FIG. 4 is a view of sensitive element 13 of FIG. 3 wherein conductive window 22 is embodied as a multilayer structure. The multiple layers of conductive window 22 shown in FIG. 4 include a metal interconnect or "glue" layer 19, a conductor layer 21 and a first contact layer 23. Glue layer 19 is, for example, chromium of 40 Å thickness that binds conductor layer 21 to infrared window 18. Disposed on glue layer 19 is conductor layer 21 that is, for example, a gold layer of 200 Å thickness. Conductor layer 21 assures that there is equal electrical potential at each of the sensitive elements in the infrared focal plane array. First contact layer 23 is disposed on conductor layer 21 and is, preferably, a 300 Å thick layer of palladium that establishes a mechanical bond and electrical contact between conductor layer 21 and the layer of semiconductor disposed on first contact layer 23. Conductive window 22 includes a transmissive area 26 where the layer or layers comprising conductive window 22 have been removed down to infrared window 18. Transmissive area 26 has a width W in the plane of the paper and a length L in the plane perpendicular to the plane of the paper. The width W need not be equal to the length L for the purposes of the present invention. The specific thickness, "T", of the transmissive area 26 need not be zero, but must be sufficiently thin to allow IR photons to pass through it. The thickness chosen, then, depends on the transmissivity of the material or materials chosen for conductive window 22.

The infrared focal plane array in accordance with the present invention includes a photoconductor layer disposed on the conductive window for changing resistivity in response to infrared photons incident thereon. As embodied herein and shown in FIG. 3, photoconductor layer 24 is a unitary layer made of materials such as lead telluride, lead tin telluride, mercury cadmium telluride or indium antimonide which change resistivity in response to IR photons incident theron and is optically thick such that IR photons do not pass through it. Photoconductor layer 24 is in ohmic contact with conductive window 22.

FIG. 4 is a view of sensitive element 13 wherein photoconductor layer 24 is embodied as a multi-layer structure including a first photoconductor layer 27 and a second photoconductor layer 29. First photoconductor layer 27 is preferably a p-type material and, as embodied herein, is a 5000 Å thick layer of $Pb_{0.85}Sn_{0.15}Te$ that is disposed over at least transmissive area 26 of conductive window 22. Second photoconductor layer 29 is preferably an n-type material and, as embodied herein, is a 4000 Å A thick layer of lead telluride (PbTe) disposed on first photoconductor layer 27. As is well known, the material $Pb_{0.85}Sn_{0.15}Te$ is sensitive to long wave infrared radiation. It is within the scope of the present invention that other materials for the first photoconductor layer 27 may be used that are sensitive to other wavelengths of infrared radiation.

The infrared focal plane array in accordance with the present invention includes an interface layer disposed on the photoconductor layer. As embodied herein and shown in FIG. 3, interface layer 30 is disposed on photoconductor layer 24 and provides ohmic contact between photoconductor layer 24 and an electron emitter layer 28 disposed on interface layer 30 and, consequently, is preferably an electrically conductive material. Preferably, interface layer 30 is sufficiently thick so as to be optically opaque to IR radiation. Interface layer 30 may be a single platinum layer in ohmic contact with photoconductor layer 24 and the electron emitter layer 28 as shown in FIG. 3.

Interface layer 30 may also be embodied as a multilayer structure as shown in FIG. 4 including an alloy layer 31 and a second contact layer 33. Alloy layer 31 is, for example, a thin layer of a conductive material, such as a metal, that is doped or alloyed into second photoconductor layer 29 by well known semiconductor doping techniques. Alloy layer 31 is provided to ensure better contact between second photoconductor layer 29 and second contact layer 33. Alloy layer 31 is, preferably, aluminum doped or alloyed into second photoconductor layer 29 to a depth of 30 Å. Second contact layer 33, as embodied herein is a single layer of aluminum of 2000 Å thickness disposed on alloy layer 31 as shown in FIG. 4 and provides electrical contact between second photoconductor layer 29 and an electron emitter layer 28.

In accordance with the present invention the infrared focal plane array includes an electron emitter layer disposed on the interface layer for emitting electrons, the interface layer providing ohmic contact between the photoconductor layer and the emitter layer. As embodied herein, an electron emitter layer 28 is provided as a layer of, for example, tantalum-tantalum oxide-gold. For a more complete description of the contruction of electron emitter layer 28 as described, attention is invited to Mead, CA, "Operation of Tunnel-Emission Devices", Journal of Applied Physics, Vol. 32, pp. 646–652, which is incorporated herein by reference. Alternatively, electron emitter 28 may be a layer of $Al_2O_3$ of 55 Å thickness as shown in FIG. 4.

The infrared converter in accordance with the present invention includes an anode in spaced relation to the electron emitter layer and anode supply means for establishing an electric field between the anode and the electron emitter, the electric field attracting electrons emitted from the emitter to the anode. As embodied herein, and shown in FIGS. 1 and 3, an anode 62 is provided to attract electrons emanating from IR focal plane array 12 and convert the electrons into an electrical signal or a visible image. Preferably, anode 62 is a light transducer, such as a viewscreen, that converts the electrons emanating from IR focal plane array 12 and falling incident thereon into visible light. Such a light transducer could be a phosphorus screen on a visible transparent barrier or fiber optic window. Electrons incident on the phosphorous screen cause it to phosphoresce, thus producing visible radiation. An array of light emitting diodes or injection lasers could also be used as anode 62. The anode could also be a spatial light modulator or light valve to allow projection or optical processing of the IR radiation converted into electrons. For a description of spatial light modulators, attention is invited to "Photoemitter Membrane Light Modulator", A. D. Fisher et al., Opt. Eng. 25(2), 261–268 (February 1986); and .Optical Data Processing For Engineers", D. Casasent, Electro-Optical Systems Design, 33–46, (April, 1978), which are hereby specifically incorporated by reference. The anode could also be embodied by a focal plane array with direct optical coupling by substituting such a focal plane array for anode 62. A focal plane array is defined herein to include all focal plane array technologies including vidicons, X-Y addressing and charge transfer devices.

An anode power supply means 64 is connected through a power line 66 to anode 62. The other pole of anode power supply means 64 is connected through a power line 68 to conductive window 22. Anode power supply means 64 establishes an electric field between anode 62 and focal plane array 12 to attract electrons, "e", emanating from focal plane array 12 to anode 62.

In a preferred embodiment, the infrared focal plane array further includes a contact layer disposed on the emitter layer, the contact layer being substantially transparent to electrons. As shown in FIG. 3, the contact layer is embodied herein as third contact layer 38. Third contact layer 38 is provided because electrons will travel from the aluminum of second contact layer 33 to the $Al_2O_3$ of emitter layer 28 but not beyond into first vacuum enclosure 77 as shown in FIG. 1. Accordingly, third contact layer 38, of a thin layer of gold, for example, is provided to attract the electrons out of emitter layer 28. Third contact layer 38 is, preferably, a 100 Å thick layer of gold. The velocity of the electrons is sufficiently high to impel them through third contact layer 38 into first vacuum enclosure 77 where they are then attracted to anode 62. This phenomenon has been reported by C. Mead in Jrnl. App. Phys., vol. 32, pp. 646–652 (1961), which is hereby specifically incorporated by reference.

The infrared focal plane array preferably also includes bias supply means for establishing an electrical bias between the emitter layer and the contact layer to attract electrons from the emitter layer to the contact layer, the electrical bias being sufficiently high to cause the electrons to pass through the contact layer. As embodied herein, and shown in FIG. 3, a bias supply means 32 is provided which has the negative terminal thereof connected to conductive window 22 and the positive terminal connected through a line 36 to third contact layer 38.

An electrical insulating layer 72 is provided around interface layer 30 and photoconductor layer 24 to ensure that there is no conductance between adjacent sensitive elements in an array of sensitive elements. Insulating layer 72 can be of any conventional dielectric material, such as barium fluoride.

Preferably, the infrared converter includes an optical interface disposed between the infrared focal plane array and a scene being viewed. As embodied herein, and shown in FIG. 1, an optical interface 40 is provided that includes an infrared transparent window 42 and an insulated spacer 44. Transparent window 42 and insulated spacer 44 are, preferably, bonded together at a first bond-line 46. A second bond-line 48 is provided between insulated spacer 44 and first face 14 of sensitive element array 12 so as to form a second vacuum enclosure 75 bounded by transparent window 42, insulated spacer 44 and first face 14 of infrared focal plane array 12. In this way, transparent window 42 is thermally insulated from infrared focal plane array 12 and can be maintained at or above ambient temperature while infrared focal plane array 12 is refrigerated in a manner explained below. Thus, condensation is prevented from forming on transparent window 42.

The IR converter preferably includes image forming means for forming an image of a scene being viewed on the first face of the infrared focal plane arrray. As embodied herein, and shown in FIG. 1, an optical system 50 is provided that may be comprised of refracting or reflecting optical components and may be a short or long focal length telescope of fixed or variable focal length, with or without zoom capability. IR radiation falls incident on optical system 50 and is brought to a focus by optical system 50 onto first surface 14 of IR focal plane array 12, as illustrated by a converging beam 52. Converging beam 52 passes through transparent window 42 and preferably comes to a focus at a focal plane coincident with first surface 14 of IR focal plane array 12.

The infrared converter may include cooling means for cooling the infrared focal plane array. As embodied herein, and shown in FIG. 1, cooling means 54 are provided for cooling IR focal plane array 12. Cooling means 54 includes a cooling collar 56 and thermal insulation 58. Cooling collar 56 provides direct thermal contact with sensitive element array 12. In some configurations, it may be necessary to circulate fluid through cooling collar 56. In such cases, a separate external cooler 60, which is a source of coolant, is provided to supply coolant through a cooling conduit 11 to cooling collar 56. A power supply 15 provides power to drive external cooler. Preferably, thermal insulation 58 is an insulating foam or other material. Thermal insulation 58 improves the thermal efficiency of cooling collar 56 and protects sensitive element array 12 from condensation.

In a preferred embodiment, the infrared converter includes an electron multiplier disposed between the infrared focal plane array and the anode to multiply the number of electrons emitted by the electron emitter. As embodied herein, an electron multiplier 70 is provided that is preferably a proximity focused microchannel plate, but may also be any dynode/microchannel plate combination. Electrons, "e", emanating from second surface 16 of array 12 fall, incident on an incident face 71 of electron multiplier 70. A microchannel plate is an array of miniature electron multipliers oriented parallel to one another and parallel to the direction of propagation of electrons, 'e', as shown in FIG. 1.

A first electron multiplier power source 73 is operably connected to electron multiplier 70 to provide a source of electrons to electron multiplier 70. For a more complete description of microchannel plates and their associated power source, attention is invited to J. L. Wiza, "Microchannel Plate Detectors", Nic. Ints. Meth., Vol. 162, pp. 587–601 (1979) which is hereby specifically incorporated by reference. A second electron multiplier power source 81 is provided to raise the potential of incident fact 71 and to complete the circuit of electron multiplier 70 with array 12 and anode 62.

Preferably, the space between second surface 16 of infrared focal plane array 12 and electron multiplier 70 is enclosed by a wall 81 and evacuated to establish a first vacuum enclosure 77. Similarly, and preferably, the space between electron multiplier 70 and anode 62 is enclosed by a wall 83 and evacuated to establish a third vacuum enclosure 79. Alternatively, infrared focal plane array 12, electron multiplier 70 and anode 62 may all be enclosed in a vacuum-tight enclosure. In this way, electrons, "e", emanating from second surface 16 of array 12 traverse an evacuated path to anode 62.

The operation of the foregoing described preferred embodiment of the present invention shown in FIGS. 1, 2 and 3 is as follows. Infrared photons, shown as arrows designated "IR", are focused by optical system 50 through transparent window 42 onto first surface 14 of infrared focal plane array 12 to form an infrared image of a scene being viewed on first surface 14.

In each of the sensitive elements included in infrared focal plane array 12 the IR photons pass through transparent support 18 and through transmissive area 26 of conductive window 22 to strike photoconductive layer 24. That portion of conductive window 22 outside of transmissive area 26 is substantially opaque to IR photons. IR photons change the resistivity of photoconductive layer 24 in proportion to the number of photons incident on it to thereby cause the release of electrons. Each of these released electrons produces other free electrons. In short, the more IR photons there are incident on photoconductive layer 24, the more electrons are released by photoconductive layer 24.

The electrons from all sources are conducted to interface layer 30 where they are passed to electron emitter layer 28 to be emitted into first vacuum enclosure 77. Since the number of electrons released by photoconductive layer 24 is proportional to the number of IR photons incident on it, the number of electrons emitted by electron emitter layer 28 is proportional to the number of photons incident on photoconductive layer 24. Anode supply 64 establishes an electrical potential difference between anode 62 and conductive window 22 to attract electrons emitted into first vacuum enclosure 77 to anode 62 where they strike an incident surface 61 of anode 62. In an alternative embodiment, electrons, "e", passing through electron multiplier 70 are multiplied before falling incident on anode 62.

The flux intensity of electrons emanating from each sensitive element in infrared focal plane array 12 is directly proportional to the flux intensity of IR photons incident on each of the sensitive element. Thus, the variations in flux intensity of electrons across incident surface 61 of anode 62 corresponds to the variations of flux intensity of IR photons across the IR image formed on first surface 14 of infared focal plane array 12. Put another way, the infrared image on first surface 14 is reproduced as a beam of electrons incident on incident surface 61. Then, depending on the type of anode 62 employed, the beam of electrons can be converted into a visible image or an electrical signal by anode 62.

Figure 5:
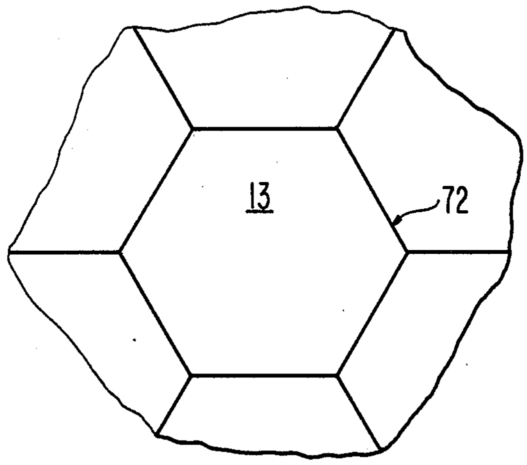
FIG. 5 is a fragmentary front view of another embodiment of an infrared focal plane array of the present invention.

While the foregoing description of preferred embodiments of the present invention discussed a single sensitive element, a plurality of sensitive elements can be provided in an infrared focal plane array as shown in FIGS. 1 and 2. While array 12 is shown in FIG. 2 as comprising a 3×3 array of sensitive elements, any number of sensitive elements may be disposed in a variety of orientations and shapes. Sensitive elements may be square, as shown in FIG. 2, may be circular, or as shown in FIG. 5, may be hexagonal. By selecting hexagonal shaped sensitive elements, rather than square, the sensitive elements can be placed closer together to provide better resolution. Further, if the pitch or separation of the sensitive elements is matched to that of the miniature electron multipliers of a microchannel plate used as the electron multiplier, the alignment between the infrared focal plane array and the microchannel plate is not critical and assembly of an IR converter in accordance with the present invention is simplified.

Figure 6:
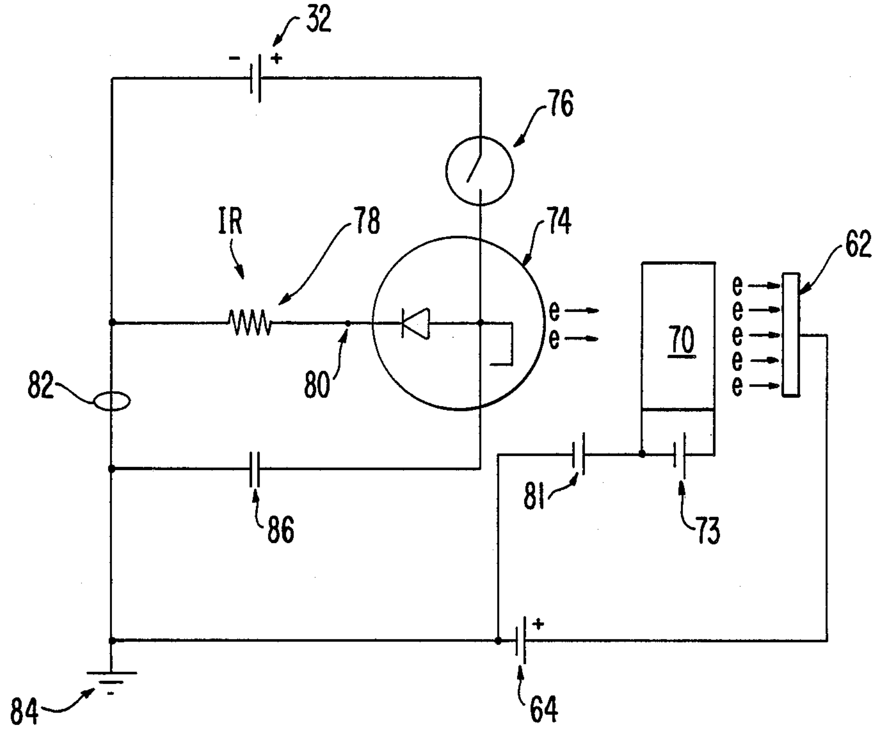
FIG. 6 is an equivalent circuit of a single sensitive element in accordance with the present invention.

FIG. 6 is an equivalent circuit of sensitive element 13 of FIG. 3 and also illustrates the relationship between a sensitive element, electron multiplier 70 and anode 62.

The sensitive element includes an electron emitter. As shown in FIG. 6, an electron emitter 74 is represented schematically by that portion of the electrical circuit enclosed by a circle. Emitter 74 corresponds to electron emitter layer 28 of FIGS. 3 and 4. Electrons, designated "e", are emitted by the emitter 74 in a manner described below.

Emission rate control means are provided for controlling the rate at which electrons are emitted from second surface 16 of array 12. The emission rate control means includes a variable resistance element 78 and a capacitor 86 to control the rate at which electrons are emitted by emitter 74. Variable resistance element 78, which performs the same function as photoconductor layer 24 of FIG. 3, is connected at one end to emitter 74 through a node 80 and at the other end to a common ground bus 82 which, in turn, is connected to ground 84. Node 80 corresponds to interface layer 30 of FIG. 3.

Capacitor 86 is provided between ground bus 82 and emitter 74 to limit noise spikes and is connected to ground to reduce interference. Preferably, the value of the capacitor is chosen so as not to limit the response speed of the IR converter. Capacitor 86 is embodied in the preferred embodiment of FIG. 3 as conductive window 22, photoconductor layer 24, interface layer 30, emitter 28, and third contact layer 38. The dielectric constant of each of the layers 24, 30 and 28, as well as the area of the layers, determines the capacitance value of capacitor 86, while conductive window 22 and third contact layer 38 are the plates of capacitor 86.

Anode 62 is connected through anode supply 64 to ground 84. Anode supply 64 establishes an electric field between anode 62 and emitter 74 so as to attract electrons, "e", emitted by emitter 74. The electrons pass through electron multiplier 70 which multiplies the number of electrons passing through it.

The sequential steps for carrying out a method of fabricating an IR focal plane array including sensitive elements in accordance with the present invention is illustrated by FIGS. 7–29.

Figure 7:
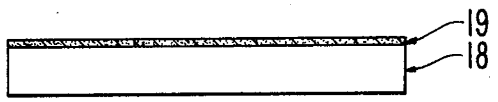
FIGS. 7–29 illustrate the successive steps in a method of fabricating the sensitive element of FIG. 4.

The process begins with infrared window 18 which is, preferably, $BaF_2$ but may be any sufficiently rigid structure capable of withstanding the process steps as described below and of supporting the layers disposed upon it and which is substantially transparent to IR radiation. IR window 18 is rinsed in distilled ionized water, placed in an ion chamber and ion cleaned. As depicted in FIG. 7 glue layer 19, preferably chromium, is disposed on IR window 18 to provide a suitable surface to which a subsequent layer or layers can be bonded to IR window 18.

Figure 8:
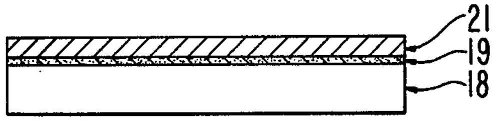
Figure 9:
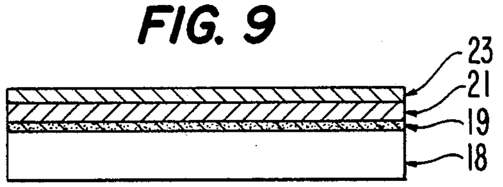

As shown in FIG. 8, conductor layer 21 is then disposed on glue layer 19. Conductor layer 21 is, for example, a layer of Au of approximately 2000 Å thickness. A first contact layer 23, is disposed on conductor layer 21 as shown in FIG. 9. First contact layer 23 is, for example, a 300 Å thick layer of Pd.

Figure 10:
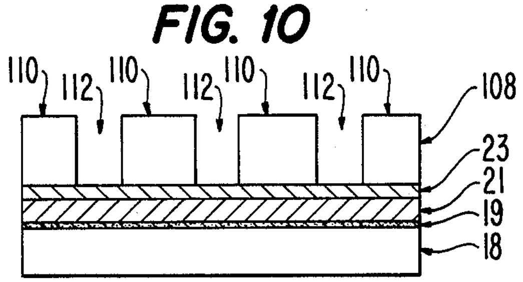
Figure 11:
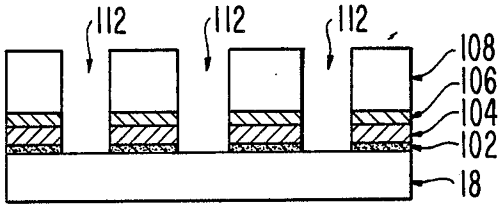

FIG. 10 shows a first layer of photoresist 108 that has been exposed under a mask, developed and hard baked to leave masked areas 110 and unmasked areas 112. As used herein the steps of exposing a photoresist layer under a mask, developing a photoresist layer, and hard baking and soft baking a photoresist layer are employed in the conventional sense known to those skilled in the art of photolithography. In addition, any convenient photoresist known to those skilled in the art of photolithography may be employed to practice the present invention. FIG. 11 illustrates the assembly of FIG. 10 following ion etching, whereby glue layer 19, conductor layer 21 and first contact layer 23 underlying unmasked areas 112 have been etched away down to infrared window 18. The remaining first photoresist layer 108 is then stripped away and the exposed areas of infrared window 18 are ion cleaned.

Figure 12:
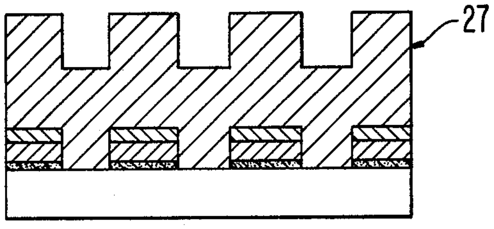
Figure 13:
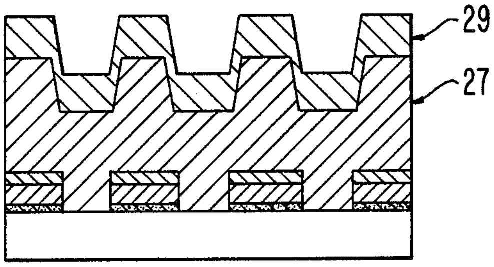
Figure 14:
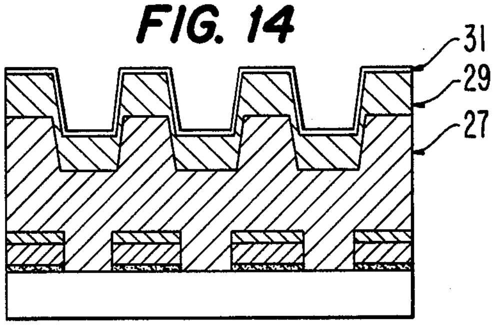

As shown in FIG. 12, a first photoconductor layer 27 is then deposited on the infrared focal plane array. As embodied herein first photoconductor layer is an approximately 5000 Å thick layer of $Pb_{.85}Sn_{.15}Te$. FIG. 13 shows a second photoconductor 29 layer deposited on the first photo conductor layer 27. As embodied herein second photoconductor layer 29 is a 4000 Å thick layer of PbTe. As shown in FIG. 14, an alloy layer 31 is disposed on the second photoconductor layer 29. As embodied herein, alloy layer 31 is a 30Å thick layer of Al alloyed or doped into the PbTe of second photoconductor layer 29.

Figure 15:
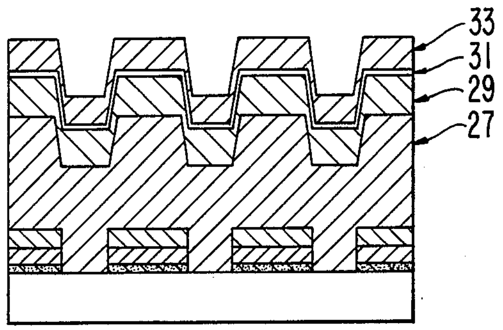

As illustrated in FIG. 15, a second contact layer 33 is disposed on alloy layer 31. As embodied herein, second contact layer 33 is a 2000Å thick layer of Al.

Figure 16:
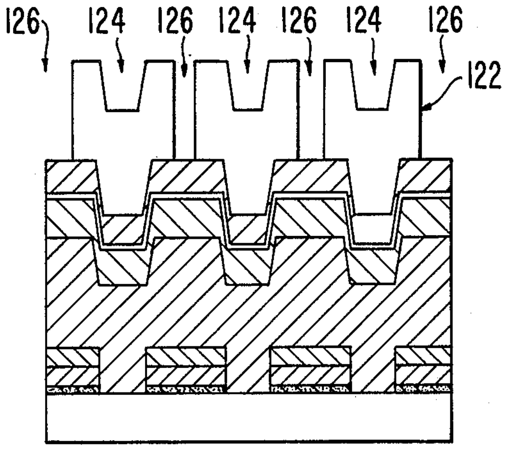
Figure 17:
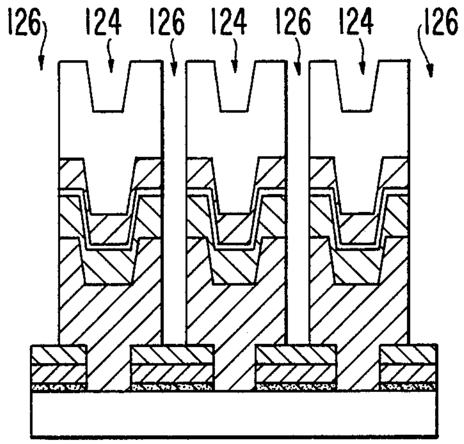

FIG. 16 illustrates a second photoresist layer 122 that has been disposed on the assembly of FIG. 15, exposed under a mask, developed and hard baked to leave covered areas 124 and exposed areas 126 of the assembly. FIG. 17 shows the result of ion etching the assembly of FIG. 16 whereby the layers underlying exposed areas 126 have been etched away to produce etched channels that extend down to first contact layer 23. Covered areas 124 covered by second photoresist layer 122 are not etched by the ion etching.

Figure 20:
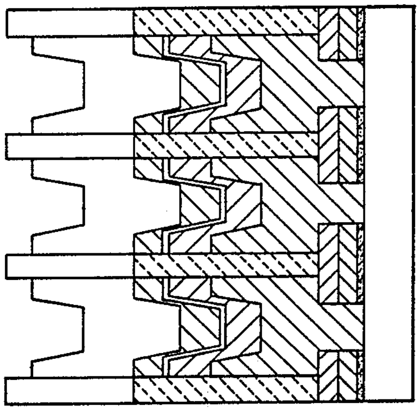
Figure 19:
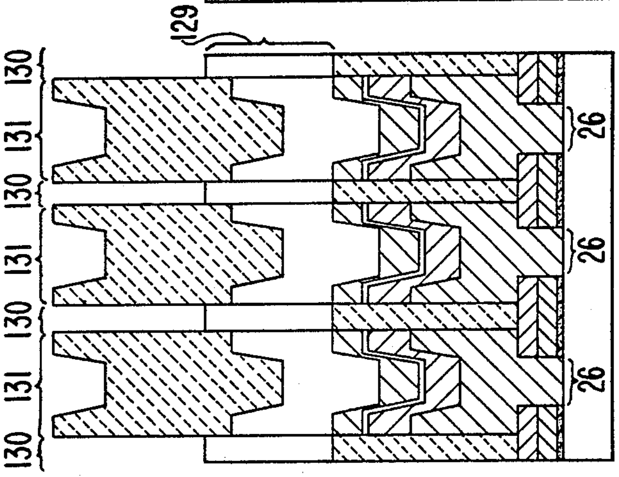
Figure 18:
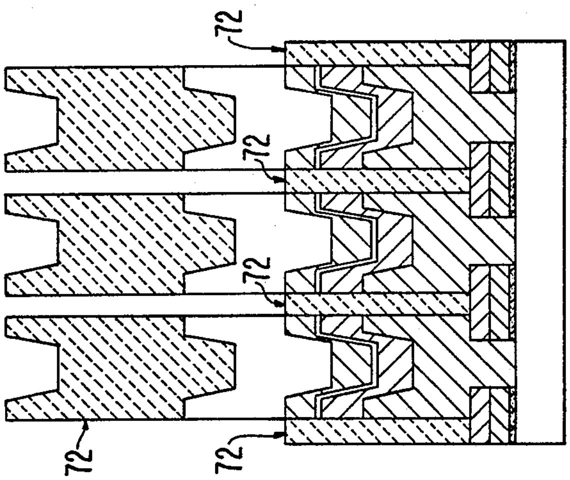
Figure 21:
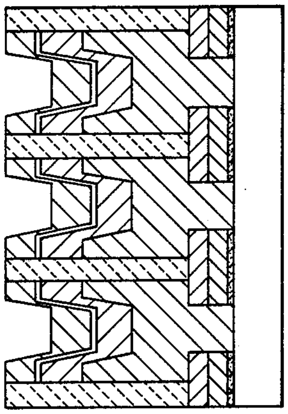

As illustrated by FIG. 18, an insulation layer 72 is disposed on the assembly of FIG. 17. As embodied herein, insulation layer 72 is a 21,500 Å thick layer of barium fluoride. The thickness of insulation layer 72 is chosen to be substantially the same as the thickness of photoconductor layer 24 and interface layer 30. FIG. 19 illustrates a third photoresist layer 129 that has been disposed on the assembly of FIG. 18, exposed under a mask, developed and hard baked to leave the covered areas 130, covered by photoresist layer 129, and uncovered areas 131. Uncovered areas 131 overlay at least transmissive areas 26 of conductive window layer 22 as shown in FIG. 19. FIG. 20 shows the result wherein the assembly of FIG. 19 has been ion etched so that insulation layer 72 corresponding to uncovered areas 131 has been removed. As shown in FIG. 21, the remaining portion of third photoresist layer 129 has been stripped away by, for example, plasma etching.

Figure 23:
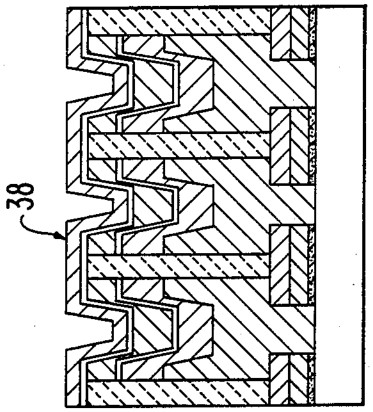
Figure 22:
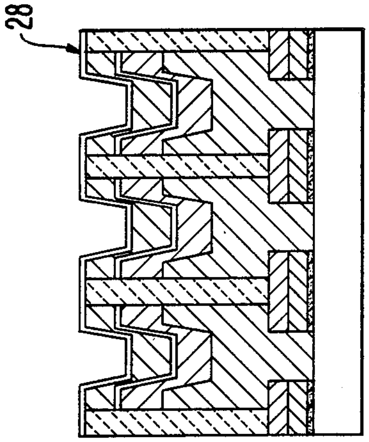

FIG. 22 shows an electron emitter layer 28 disposed on the assembly of FIG. 20. As embodied herein, electron emitter layer 28 is a 55 Å thick layer of $Al_2O_3$. As shown in FIG. 23, a third contact layer 38 is then disposed on emitter layer 28. As embodied herein, third contact layer 38 is a 100 Å thick layer of Au.

Figure 25:
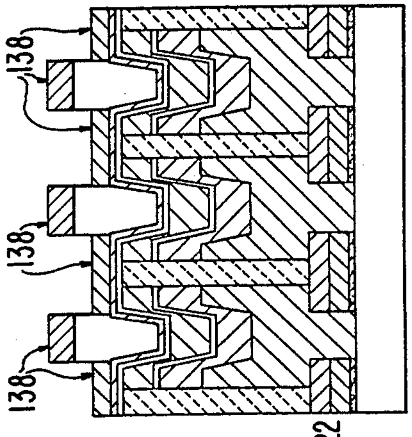
Figure 24:
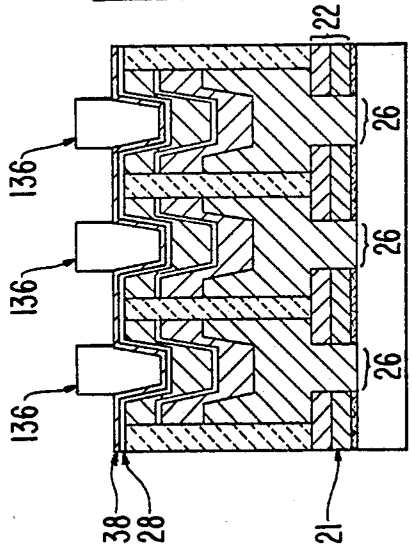

FIG. 24 illustrates the assembly of FIG. 23 after a fourth photoresist layer 136 has been disposed upon it, exposed under a mask and developed. The remaining portion of fourth photoresist layer 136 overlays only that portion of the assembly corresponding to transmissive area 26 of conductive window 22. As shown in FIG. 25, a fourth contact layer 138 is disposed on the assembly of FIG. 24. As embodied herein, fourth contact layer 138 is a 2000Å thick layer of Au. Fourth contact layer 138 ensures contact between all of the electron emitters in the infrared focal plane array 12 of the present invention and bias supply means 32.

Figure 26:
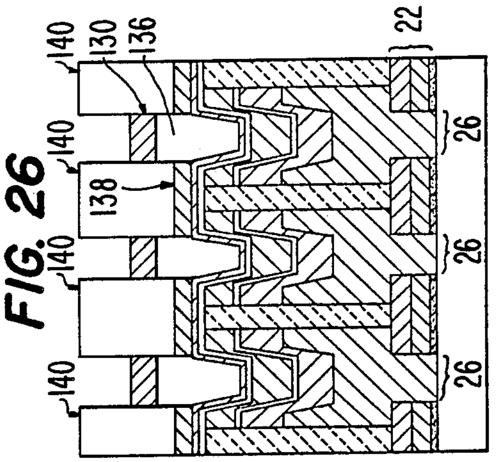
Figure 28:
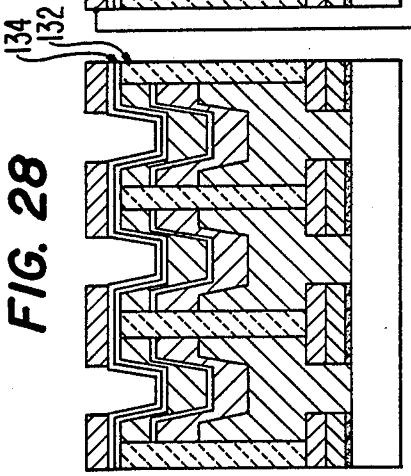
Figure 27:
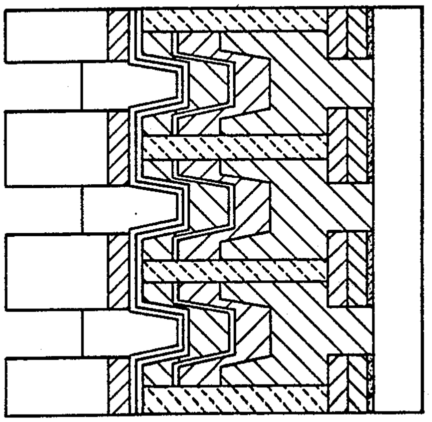

As shown in FIG. 26 a fifth photoresist layer 140 is disposed on the assembly of FIG. 24, soft baked, exposed under a mask and developed so that that portion of fourth contact layer 138 overlying transmissive area 26 of conductive window 22 is exposed. FIG. 27 illustrates the assembly of FIG. 26 wherein the exposed portion of fourth contact layer 138 has been etched away down to fourth photoresist layer 136 by, for example, ion etching. The remaining photoresist of fourth and fifth photoresist layers, 136 and 140, respectively, is stripped away by conventional techniques as shown in FIG. 28. FIG. 28, then, is a finished infrared focal plane array in accordance with the present invention.

Figure 29:
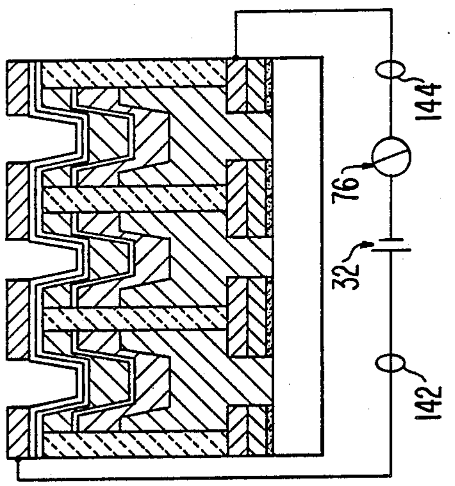

FIG. 29 illustrates an infrared focal plane array in accordance with the present invention being tested wherein bias supply means 32 is connected via line 142 to fourth contact layer 138 and at the other terminal through a line 144 to first contact layer 23. Ammeter 76 reads the current load.

It will be apparent to those skilled in the art that various modifications and variations can be made in the IR converter of the present invention without departing from the scope or spirit of the invention. Thus, it is intended that the present invention cover the modifications and variations of this invention provided they come within the scope of the appended claims and their equivalents.

What is claimed is:

1. An infrared converter for converting infrared radiation emanating from a scene being viewed into a beam of electrons, comprising:

(A) an infrared focal plane array having opposed first and second surfaces, the array including:

an infrared transparent window having opposed first and second surfaces, said first surface of said infrared transparent window being said first surface of said array, said infrared transparent window being substantially transparent to infrared radiation emanating from the scene being viewed;

an electrically conductive window disposed on the second surface of said infrared transparent window, said electrically conductive window being substantially opaque to infrared radiation and including one or more transmissive areas substantially transparent to infrared radiation;

a photoconductor layer disposed on said conductive window for changing resistivity in response to infrared photons incident thereon;

an interface layer disposed on said photoconductor layer; and an emitter layer disposed on said interface layer for emitting electrons, said interface layer providing ohmic contact between said photoconductor layer and said emitter layer;

(B) an anode disposed in spaced relation to said electron emitter; and (C) anode supply means for establishing an electric field between said anode and said electron emitter, said electric field attracting electrons emitted from said emitter to said anode.

2. The infrared converter as claimed in claim 1 further including:

a contact layer disposed on said emitter layer, said contact layer being substantially transparent to electrons; and bias supply means for establishing an electrical bias between said emitter layer and said contact layer to attract electrons emitted from said emitter layer toward said contact layer, the electrical bias being sufficiently high to cause the electrons to pass through said contact layer.

3. The infrared converter as claimed in claim 1 further including an optical interface disposed between said infrared focal plane array and a source of infrared radiation, said optical interface being thermally isolated from said infrared focal plane array.

4. The infrared converter as claimed in claim 3 further including cooling means for cooling said infrared focal plane array.

5. The infrared converter as claimed in claim 4 further including an electron multiplier disposed between said infrared focal plane array and said anode to multiply the number of electrons emitted by said electron emitter.

6. The infrared converter as claimed in claim 1 wherein said anode is a phosphorous screen disposed on a substrate

7. The infrared converter as claimed in claim 1 wherein said anode is a focal plane array.

8. A sensitive element for use in an infrared converter, said element comprising:

(A) an electron emitter; and (B) electron emission rate control means for controlling the rate at which electrons are emitted from said electron emitter in response to the intensity of infrared radiation incident on said electron emission rate control means, said control means including:

an infrared transparent window, being substantially transparent to infrared radiation;

an electrically conductive window disposed on said infrared transparent window, said electrically conductive window being substantially opaque to infrared radiation and including a transmissive area substantially transparent to infrared radiation;

a photoconductor layer disposed on said conductive window for changing resistivity in response to infrared photons incident thereon; and an interface layer disposed to provide ohmic contact between said photoconductor layer and said electron emitter.

9. The sensitive element as claimed in claim 8 further including:

a contact layer disposed on said electron emitter, said contact layer being substantially transparent to electrons; and bias supply means for establishing an electrical bias between said emitter layer and said contact layer to attract electrons emitted from said emitter layer toward said contact layer, the electrical bias being sufficiently high to cause the electrons to pass through said contact layer.

10. A method of making an infrared focal plane array having opposed first and second surfaces, comprising:

providing an infrared transparent window being substantially transparent to infrared radiation and having opposed first and second surfaces, said first surface of said infrared transparent window being said first surface of said array;

disposing an electrically conductive window on said second surface of said infrared transparent window, said electrically conductive window being substantially opaque to infrared radiation;

forming one or more transmissive areas in said electrically conductive window that are substantially transparent to infrared radiation;

disposing a photoconductor layer on said conductive window, said photoconductor layer changing resistivity in response to infrared photons incident thereon;

disposing an interface layer on said photoconductor layer; and disposing an emitter layer on said interface layer for emitting electrons, said interface layer providing ohmic contact between said photoconductor layer and said emitter layer.

11. A method as claimed in claim 10 further including:

disposing a contact layer on said emitter layer, said contact layer being substantially transparent to electrons.

12. The method as claimed in claim 10 wherein said step of forming one or more transmissive areas includes:

disposing a first layer of photoresist on said electrically conductive window;

exposing under a mask, developing and baking said first photoresist layer to provide masking portions of said first photoresist layer wherein a portion of said conductive window is covered thereby and one or more unmasking portions of said first photoresist layer wherein a portion of said conductive window is uncovered thereby; and etching said one or more uncovered areas of said electrically conductive window to form etched-back areas in said electrically conductive window that are substantially transparent to infrared radiation.

13. The method as claimed in claim 10, further including:

disposing a second photoresist layer on said interface layer;

exposing under a mask, developing and baking said second photoresist layer to produce masking portions of said second photoresist layer wherein a portion of said interface layer is covered thereby and unmasking portions of said second photoresist layer, substantially overlying areas of said conductive window between said transmissive areas, wherein a portion of said interface layer is uncovered;

etching away said uncovered areas of said interface layer and of the areas of said photoconductor layer disposed beneath said uncovered areas of said interface layer to said electrically conductive window to provide etched channels;

disposing an insulation layer in said etched channels and on said masking portions of said second photoresist layer to a depth equal to substantially that of said photoconductor layer and said interface layer;

disposing a third photoresist layer on said insulation layer and exposing, developing and baking said third photoresist layer to provide a masking portion of said third photoresist layer overlying the portion of said insulation layer disposed in said etched channels;

stripping away said insulation layer overlying said masking portion of said second photoresist layer; and stripping away said masking portions of said second and said third photoresist layers.

14. A method as claimed in claim 11 in which said step of disposing a contact layer further includes;

disposing a fourth photoresist layer on said emitter layer;

exposing under a mask, developing and baking said fourth photoresist layer to produce masking portions of said fourth photoresist layer, substantially overlying said transmissive areas, wherein a portion of said emitter layer is covered thereby and unmasking portions wherein a portion of said emitter layer is uncovered thereby;

disposing a contact layer material on said covered and uncovered portions of said emitter layer;

disposing a fifth photoresist layer on said contact layer material;

exposing under a mask, developing and baking said fifth photoresist layer to produce masking portions of said fifth photoresist layer wherein a portion of said contact layer material is covered thereby and unmasking portions wherein a portion of said contact layer material is uncovered thereby;

stripping away said uncovered portions of said contact layer material; and stripping away said masking portions of said fourth and fifth photoresist layers.

* * * * *

UNITED STATES PATENT AND TRADEMARK OFFICE
CERTIFICATE OF CORRECTION

PATENT NO. : 4,914,296

DATED : April 3, 1990

INVENTOR(S) : Ralph R. Reinhold and Melvin G. Wode

It is certified that error appears in the above-identified patent and that said Letters Patent is hereby corrected as shown below:

Column 1, line 35, "hemetically" should be --hermetically--.

Column 3, line 45, "cyrogenic" should be --cryogenic--.

Column 4, line 47, "4000 ÅA thick" should be --4000 Å thick--.

Column 5, line 53, ".Optical" should be --"Optical--

IN THE CLAIMS

Column 12, line 6, after "substrate" insert --transparent to visible radiation--.

Signed and Sealed this

Second Day of April, 1991

Attest:

HARRY F. MANBECK, JR.

Attesting Officer

Commissioner of Patents and Trademarks